United States Patent
Hagimura et al.

(10) Patent No.: US 8,780,736 B2
(45) Date of Patent: Jul. 15, 2014

(54) COMMUNICATION APPARATUS AND HEAT GENERATION SUPPRESSING METHOD

(75) Inventors: Dai Hagimura, Yokohama (JP); Yasuyuki Mitsumori, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 122 days.

(21) Appl. No.: 13/425,897

(22) Filed: Mar. 21, 2012

(65) Prior Publication Data

US 2012/0287943 A1   Nov. 15, 2012

(30) Foreign Application Priority Data

May 13, 2011   (JP) ................................. 2011-107858

(51) Int. Cl.
*G01R 31/08* (2006.01)

(52) U.S. Cl.
USPC ....................................................... 370/248

(58) Field of Classification Search
USPC ............ 370/249, 241, 248; 375/296; 709/224
See application file for complete search history.

(56) References Cited

U.S. PATENT DOCUMENTS 5,070,536 A * 12/1991 Mahany et al. ............ 455/67.14

FOREIGN PATENT DOCUMENTS

| JP | 11-255442 | 9/1999 |
| JP | 2002-229663 | 8/2002 |
| JP | 2003-076444 | 3/2003 |
| WO | WO-2008-129638 | 10/2008 |

* cited by examiner

*Primary Examiner* — Chandrahas Patel
(74) *Attorney, Agent, or Firm* — Fujitsu Patent Center

(57) ABSTRACT

A communication apparatus includes a temperature sensor, a memory, and a processor. The temperature sensor measures temperature. The memory stores association groups of packet transmission rates associated with at least one of individual ports and individual transmission flows. The processor selects, based on the measured temperature, one of the association groups for suppressing heat generation, and controls reception rates using the packet transmission rates of the selected association group.

8 Claims, 13 Drawing Sheets

FIG. 5

18a PROFILE TABLE

| PROFILE # | | 0 | 1 | 2 | 3 | 4 | 5 |
|---|---|---|---|---|---|---|---|
| PORT P1 (HIGH PRIORITY) | Policer | 1Gbps | 1Gbps | 800 Mbps | 500 Mbps | 300 Mbps | 0bps |
| PORT P2 (HIGH PRIORITY) | Policer | 1Gbps | 1Gbps | 800 Mbps | 500 Mbps | 300 Mbps | |
| | | | -------- | | | | |
| PORT Pn (LOW PRIORITY) | Policer | 1Gbps | 800 Mbps | 700 Mbps | 300 Mbps | 0 bps | |

FIG. 6

18b PROFILE TABLE

| PROFILE # | | 0 | 1 | 2 | 3 | 4 | 5 |
|---|---|---|---|---|---|---|---|
| VLAN—0 (HIGH PRIORITY) | Policer | 1Gbps | 1Gbps | 800 Mbps | 500 Mbps | 300 Mbps | 0bps |
| VLAN—1 (HIGH PRIORITY) | Policer | 1Gbps | 1Gbps | 800 Mbps | 500 Mbps | 300 Mbps | |
| ......... | | | | | | | |
| VLAN—4095 (LOW PRIORITY) | Policer | 1Gbps | 800 Mbps | 700 Mbps | 300 Mbps | 0 bps | |

TEMPERATURE UPSHIFT

TEMPERATURE DOWNSHIFT

FIG. 12

19 SOURCE CARD MANAGEMENT TABLE

| CARD NUMBER (19-1) | SOURCE CARD (19-2) |
|---|---|
| 1 | OUT OF COMMUNICATION |
| 2 | OUT OF COMMUNICATION |
| 3 | IN COMMUNICATION |
| ⋮ | ⋮ |
| 17 | IN COMMUNICATION |
| 18 | IN COMMUNICATION |
| 19 | IN COMMUNICATION |
| 20 | OUT OF COMMUNICATION |

COMMUNICATION APPARATUS AND HEAT GENERATION SUPPRESSING METHOD

CROSS-REFERENCE TO RELATED APPLICATION

This application is based upon and claims the benefit of priority of the prior Japanese Patent Application No. 2011-107858, filed on May 13, 2011, the entire contents of which are incorporated herein by reference.

FIELD

The embodiment and modifications discussed herein are related to communication apparatuses for performing information communication and heat generation suppressing methods for suppressing heat generation.

BACKGROUND

In regard to networks provided by telecommunications carriers, communication of a telephone audio signal using the synchronous optical network (SONET) or the synchronous digital hierarchy (SDH) has conventionally been the mainstream. However, packet communication based on the Internet protocol (IP) has increasingly gained popularity in recent years. An increase in traffic due to a rapid increase in the number of Internet users has encouraged the establishment of high-speed and large-capacity networks (40 Gbps and 100 Gbps, for example). As packet communication increases in speed and capacity, processing frequency of individual functional blocks in each communication device increases. This leads to an increase in power consumption, which in turn causes heat generation in the device. If the heat generation exceeds a predetermined value, thermal runaway occurs in the device and causes device failures, such as abnormal operation. Accordingly, it is important to implement an adequate heat suppression measure.

International Publication Pamphlet No. WO 2008/129638A1

As a measure for suppressing heat generation associated with an increase in power consumption, a conventional technology proposes to perform transmission rate control according to a measured temperature. For example, there is a disclosed technique for controlling a frame sending quantity according to a measured temperature (see International Publication Pamphlet No. WO 2008/129638A1, for example). However, the conventional technology does not have a system for managing variably configurable association groups (profiles) of transmission rates associated with individual ports or individual transmission flows. As a result, the conventional technology is not capable of readily making changes in settings of the transmission rates in order to vary the transmission rates according to the heat generation temperature.

SUMMARY

In one aspect of the embodiments, there is provided a communication apparatus including a temperature sensor configured to measure temperature; a memory configured to store association groups of packet transmission rates associated with at least one of individual ports and individual transmission flows; and a processor configured to select, based on the measured temperature, one of the association groups of packet transmission rates for suppressing heat generation, and control reception rates using the selected association group of packet transmission rates.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 illustrates a configuration example of a profile table;

FIG. 6 illustrates a configuration example of another profile table;

FIG. 12 illustrates a configuration example of a source card management table.

DESCRIPTION OF EMBODIMENTS

Figure 1:
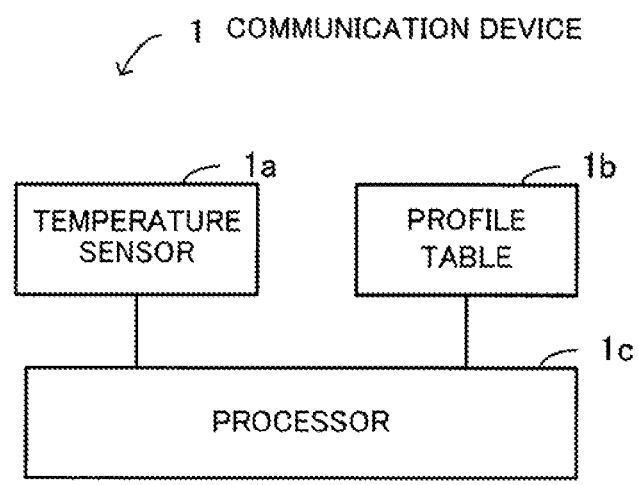
FIG. 1 illustrates a configuration example of a communication device.

An embodiment will be described below with reference to the accompanying drawings, wherein like reference numerals refer to like elements throughout.

FIG. 1 illustrates a configuration example of a communication device. Note that hereinafter information transmission units, including Ethernet (registered trademark) frame format and the like, are referred to as packets. A communication device 1 includes a temperature sensor 1a, a profile table 1b, and a processor 1c. The temperature sensor 1a is disposed, for example, near a device which generates a large amount of heat to measure the temperature of the device. The profile table 1b is a table for managing association groups of packet transmission rates which are associated with at least one of individual ports and individual transmission flows. In addition, the profile table 1b is variably configurable by an external access or the like. The profile table 1b is stored in a storage medium, such as a memory. The processor 1c selects an association group for promoting control of the heat generation based on measured temperature values. Subsequently, the processor 1c controls reception rates using the selected association group of transmission rates for at least one of individual ports and individual transmission flows. Specifically, the processor 1c thins out and discards received packets at a predetermined rate in such a manner that each of the reception rates becomes a corresponding one of the transmission rates of the selected association group. Thus, by having the profile table 1b and freely setting arbitrary transmission rates according to the measured temperature values, the reception rates are controlled in order to suppress the heat generation. With this, it is possible to improve flexibility and convenience in the suppression of the heat generation.

Figure 2:
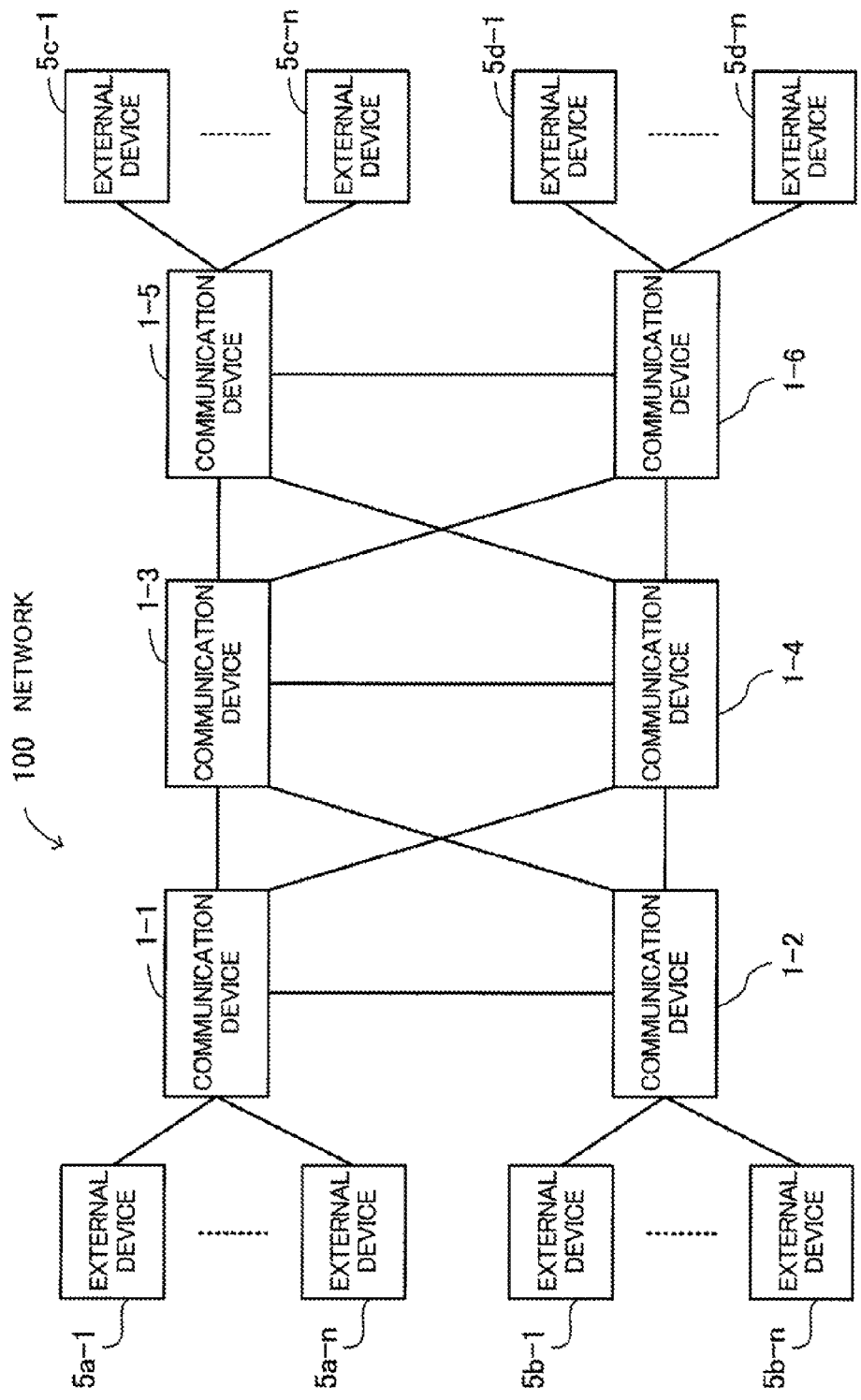
FIG. 2 illustrates a configuration example of a network.

Next described is a configuration of a network to which the communication device 1 is applied. FIG. 2 illustrates a configuration example of the network. A network 100 includes communication devices 1-1 to 1-6 and external devices (such as maintenance terminals) 5a-1 to 5a-n, 5b-1 to 5b-n, 5c-1 to 5c-n, and 5d-1 to 5d-n. The communication device 1-1 is connected to the communication devices 1-2, 1-3, and 1-4. The communication device 1-2 is connected to the communication devices 1-1, 1-3, and 1-4. The communication device 1-3 is connected to the communication devices 1-1, 1-2, 1-4, 1-5, and 1-6. The communication device 1-4 is connected to the communication devices 1-1, 1-2, 1-3, 1-5, and 1-6. The communication device 1-5 is connected to the communication devices 1-3, 1-4, and 1-6. The communication device 1-6 is connected to the communication devices 1-3, 1-4, and 1-5. In addition, to the communication device 1-1, the external devices 5a-1 to 5a-n are connected. To the communication device 1-2, the external devices 5b-1 to 5b-n are connected. To the communication device 1-5, the external devices 5c-1 to 5c-n are connected. To the communication device 1-6, the external devices 5d-1 to 5d-n are connected. Note that where differentiation is not required, the "communication device 1" is used for one or more of the communication devices, and the "external device 5" is used for one or more of the external devices. The communication device 1 receives packets transmitted from the external devices, and transfers each of the packets to a predetermined destination based on address information or the like stored in the packet. For example, in the case where an external device transmits a packet, the communication device 1 transfers the packet based on a media access control (MAC) address, an IP address, or the like stored in the packet.

Figure 3:
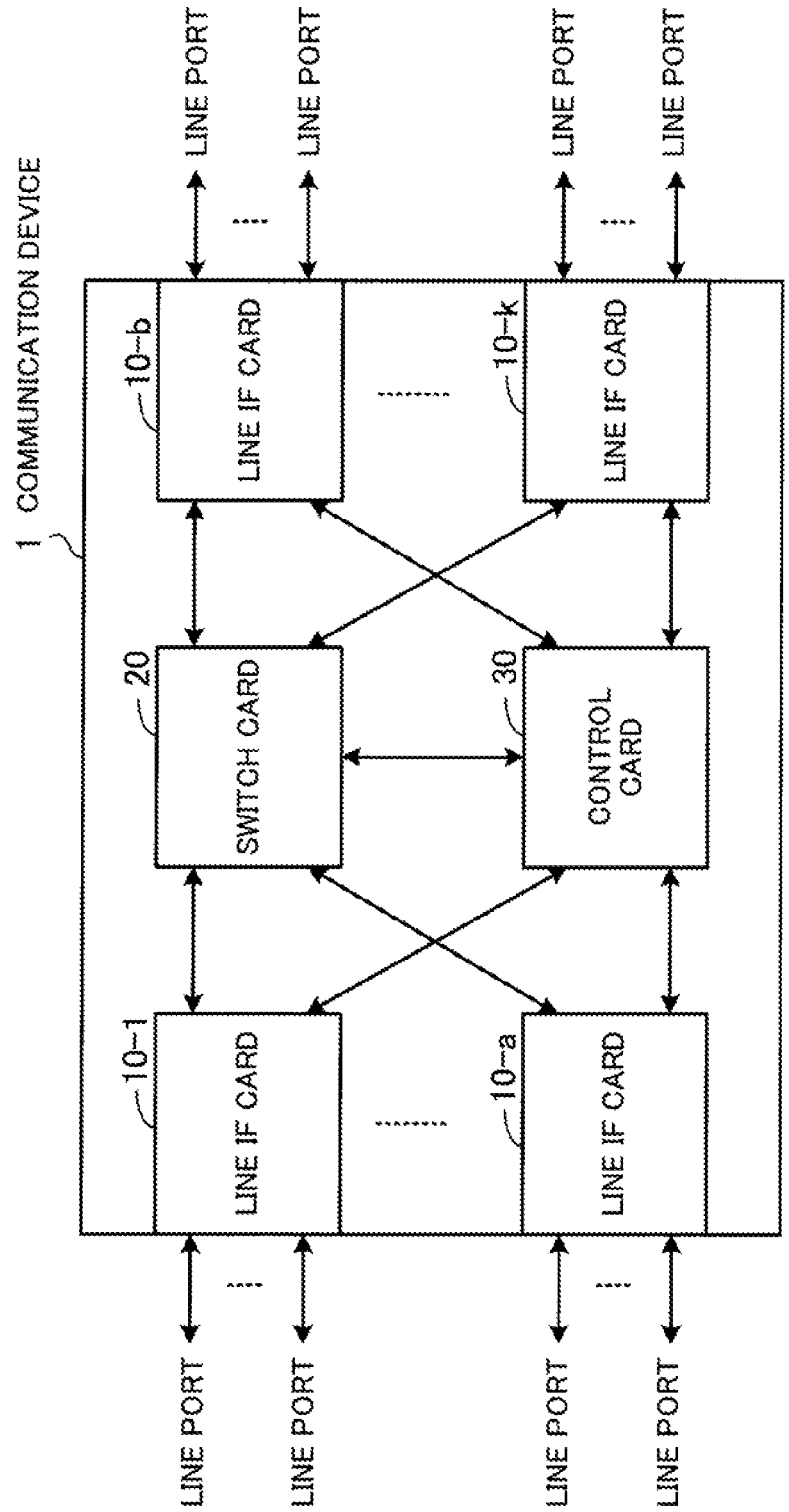
FIG. 3 illustrates another configuration example of the communication device.

FIG. 3 illustrates another configuration example of the communication device. The communication device 1 includes line interface (IF) cards 10-1 to 10-a and 10-b to 10-k, a switch card 20, and a control card 30. The line IF cards 10-1 to 10-a and 10-b to 10-k, the switch card 20, and the control card 30 are arbitrarily detachable. Each of the line IF cards 10-1 to 10-a and 10-b to 10-k houses line ports, and performs a function of interfacing with external devices, received packet processing, transmission packet processing, and the like. The switch card 20 is connected to the line IF cards 10-1 to 10-a and 10-b to 10-k by data signal lines, and performs switch processing of packet transfer among the line IF cards. The control card 30 is connected to the line IF cards 10-1 to 10-a and 10-b to 10-k and the switch card 20 by control signal lines. The control card 30 configures various settings for individual cards in the communication device 1, and collects alarm information and statistical information. In addition, the control card 30 is connected to external devices, such as maintenance terminals, and performs user interface processing with the external devices. Note that the line IF cards 10-1 to 10-a and 10-b to 10-k, the switch card 20, and the control card 30 may be integrally configured with a mother board of the communication device 1.

Figure 4:
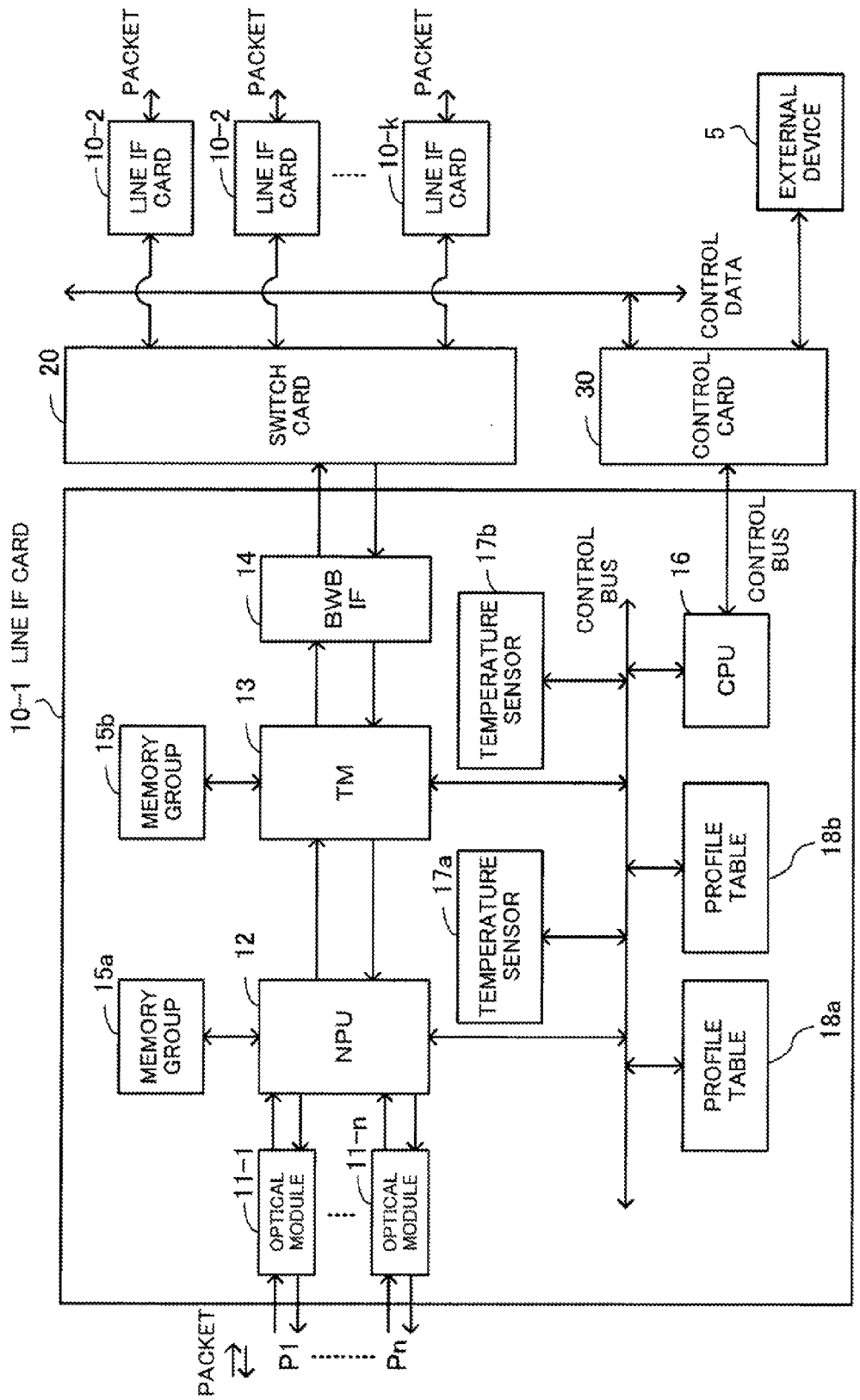
FIG. 4 illustrates a configuration example of a line IF card.

Next described is a configuration of each of the line IF cards. FIG. 4 illustrates a configuration example of a line IF card. The line IF card 10-1 includes optical modules 11-1 to 11-n, a network processor unit (NPU) 12, a traffic manager (TM) 13, a back wiring board interface (BWBIF) 14, memory groups 15a and 15b, a central processing unit (CPU) 16, temperature sensors 17a and 17b, and profile tables 18a and 18b. The line IF cards 10-1 to 10-k have the same functional configuration. Note that the profile selecting function of the processor 1c of FIG. 1 is implemented by the CPU 16, and the reception rate control function of the processor 1c is implemented by the NPU 12. Each of the optical modules 11-1 to 11-n receives an optical packet via a corresponding one of ports (physical ports) P1 to Pn, then performs optical-electrical (O/E) conversion on the received optical packet, and transmits the converted packet to the NPU 12. With reference to an address table stored in the memory group 15a, the NPU 12 searches for a destination address, and performs packet analysis in terms of packet priority and tag information. Based on the destination address and the priority, the TM 13 transfers the packet analyzed by the NPU 12 to a corresponding queue in the memory group 15b. Subsequently, the TM 13 reads a packet from a predetermined queue and outputs the packet to the BWBIF 14. The BWBIF 14 transmits the received packet to the switch card 20, and the switch card 20 then transmits the packet to a corresponding line IF card based on the destination. Besides the profile selecting function, the CPU 16 connected to the external device 5 via the control card 30 performs setting control of individual components disposed inside the line IF card 10-1 based on settings instructed by the external device 5. In addition, the CPU 16 performs monitoring control of the individual components of the line IF card 10-1 and transmits the monitoring result to the external device 5.

If the amount of packet flow received by the line IF card 10-1 increases, the frequency that the NPU 12 searches for a destination address with reference to the address table stored in the memory group 15a also increases. In addition, the frequency that the TM 13 transfers a packet to a queue in the memory group 15b increases. As a result, the power consumption of devices constituting the NPU 12 and devices constituting the TM 13, and further the power consumption of the memory groups 15a and 15b increase, which in turn causes heat generation. Therefore, in the line IF card 10-1, the temperature sensor 17a is disposed adjacent to the NPU 12 in order to measure the temperature of the NPU 12. In addition, the temperature sensor 17b is disposed adjacent to the TM 13 in order to measure the temperature of the TM 13.

Further, the line IF card 10-1 includes the profile tables 18a and 18b used for transmission rate control of received packets. The profile table 18a is a table used for transmission rate control of received packets with respect to the individual ports P1 to Pn. The profile table 18b is a table used for transmission rate control of received packets with respect to individual virtual local area networks (VLANs). The profile tables 18a and 18b are stored in a storage medium, such as a memory. The profile tables 18a and 18b may be individually stored in different memories, or may be both stored in a single memory. Note that the transmission rate control of received packets with respect to individual VLANs means that allowable rate control is performed according to individual VLAN identifiers (VLAN-IDs) stored in packets. Here, VLANs are taken as an example, however, the transmission rate control may be performed on different transmission flow units. Note that the temperature sensor 17a (for the NPU 12), the temperature sensor 17b (for the TM 13), the profile table 18a (port-based), the profile table 18b (VLAN-based), and the CPU 16 are connected to one another by a control bus. The CPU 16 writes predetermined data in the profile tables 18a and 18b, and reads predetermined data from the profile tables 18a and 18b.

As described above, if received packets increase in a large amount and thereby cause high load, the power consumption of the NPU 12 and the TM 13 increases, which generates heat. Therefore, the temperature of the NPU 12 and the TM 13 is monitored using the temperature sensors 17a and 17b, respectively, and the CPU 16 periodically reads temperature data from the temperature sensors 17a and 17b. Then, according to the results obtained from the temperature measurements, control of reception rates is performed with respect to individual ports or individual VLANs. More specifically, the CPU 16 performs the reception rate control on the NPU 12 based on a profile set in an appropriate one of the profile tables 18*a* and 18*b*. According to transmission rates set by the CPU 16, the NPU 12 performs transmission rate control of received packets with respect to individual ports or individual VLANs, and discards, on the input side of the NPU 12, packets input beyond set rate values. Performing such control reduces the number of accesses to the memory group 15*a*, and also reduces the processing frequency of the TM 13 in the subsequent stage. Accordingly, it is possible to reduce the power consumption and suppress the temperature increase.

Next descried are the profile tables. FIGS. 5 and 6 illustrate configuration examples of the profile tables. In the profile table 18*a* of FIG. 5, allowable transmission rates are set for the individual ports P1 to Pn, and multiple allowable rates are configurable for each port according to profile numbers (#). Assume here that the ports P1 and P2 have high priorities and the port Pn has a low priority. According to the example of FIG. 5, in profile #1, an allowable rate of 1 Gbps is set for each of the ports P1 and P2 while an allowable rate of 800 Mbps is set for the port Pn. Note that "0 bps" means not performing the profile-based transmission rate control. For example, in the case of 0 bps in profile #5, no transmission rate control is performed for the entire ports P1 to Pn. In the profile table 18*b* of FIG. 6, allowable transmission rates are set for individual VLAN-0 to VLAN-4095, and multiple allowable rates are configurable for each VLAN according to the profile numbers. Assume here that VLAN-0 and VLAN-1 have high priorities and VLAN-4095 has a low priority. According to the example of FIG. 6, in profile #1, an allowable rate of 1 Gbps is set for each of VLAN-0 and VLAN-1 while an allowable rate of 800 Mbps is set for VLAN-4095. Note that in terms of setting of the allowable rate values described above, arbitrary values can be set from the external device 5.

Figure 7:
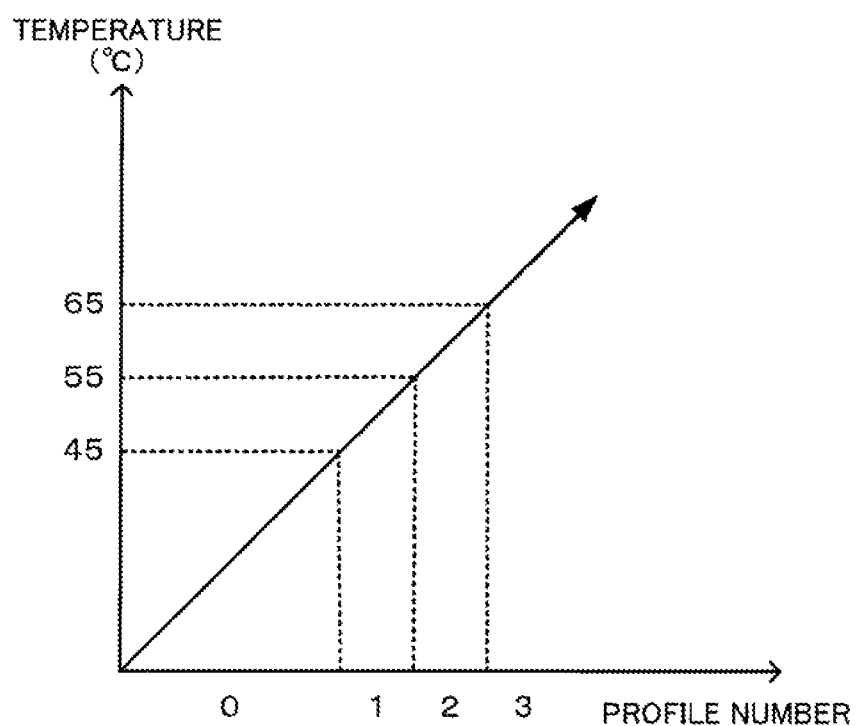
FIG. 7 illustrates a relationship between profiles and temperature.
Figure 8:
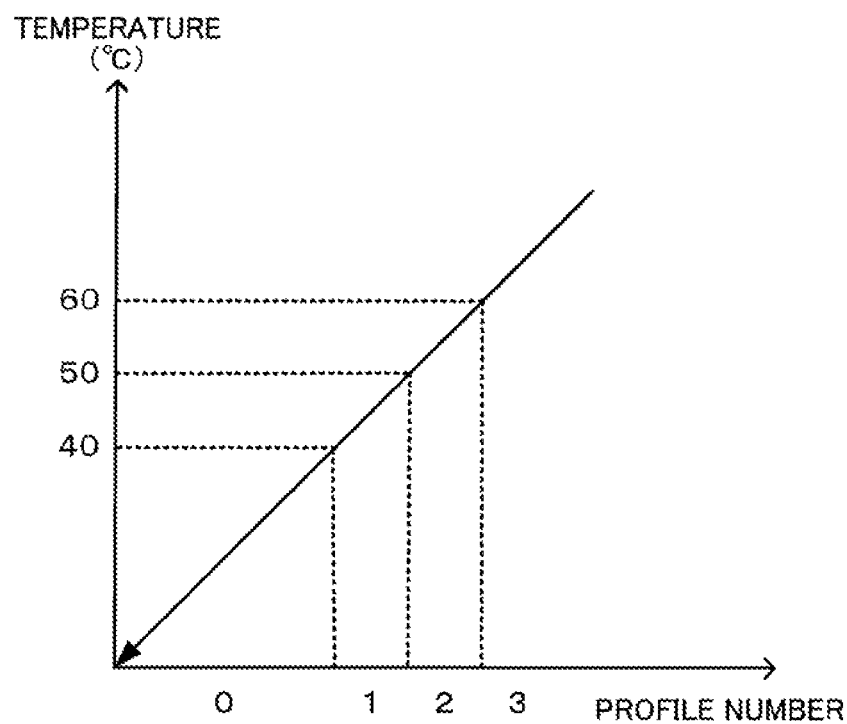
FIG. 8 illustrates another relationship between the profiles and the temperature.

Next described are relationships between profiles and temperature. FIGS. 7 and 8 illustrate the relationships between the profiles and the temperature. In each of FIGS. 7 and 8, the vertical axis represents the temperature (° C.), and the horizontal axis represents the profile numbers. FIG. 7 illustrates the relationship between the profiles and the temperature at the time of temperature upshift (first correspondence relationship), and FIG. 8 illustrates the relationship between the profiles and the temperature at the time of temperature downshift (second correspondence relationship). In FIG. 7, there are three threshold temperature values of 45° C., 55° C., and 65° C. (the temperature values can be changed from the external device 5). According to the example of the temperature being on the rise, profile #0 is applied when the temperature is below 45° C., and profile #1 is applied when the temperature is 45° C. or more but below 55° C. Also, profile #2 is applied when the temperature is 55° C. or more but below 65° C., and profile #3 is applied when the temperature is 65° C. or more. In FIG. 8, there are three threshold temperature values of 40° C., 50° C., and 60° C. According to the example of the temperature being on the decline, profile #3 is applied when the temperature is 60° C. or more, and profile #2 is applied when the temperature is 50° C. or more but below 60° C. Also, profile #1 is applied when the temperature is 40° C. or more but below 50° C., and profile #0 is applied when the temperature is below 40° C.

Here in the case illustrated in FIGS. 7 and 8, a hysteresis (difference) of 5° C. is provided between the threshold values for temperature upshift and those for temperature downshift. By providing the hysteresis between the temperature upshift direction and the temperature downshift direction, it is possible to prevent oscillation at the time of the profile application. Assume, for example, that no such a hysteresis is provided, and a threshold temperature of 55° C. is set both in the temperature rising and decreasing directions. Profile #1 is applied when the temperature is 55° C. or less, and profile #2 is applied when the temperature exceeds 55° C. In this case, when the measured temperature values are around 55° C., profile #1 and profile #2 are alternately repeated. In order to prevent such a phenomenon, a hysteresis is provided between the temperature rising and decreasing directions.

Note that as an example of profile configuration in relation to the temperature, profiles may be set according to the traffic usage situation, to thereby reduce the power consumption. For example, in the case where traffic is large in volume during daytime but small during night-time, different profiles suitable for the individual time divisions are provided. With this, it is possible to reduce packet processing load.

Figure 9:
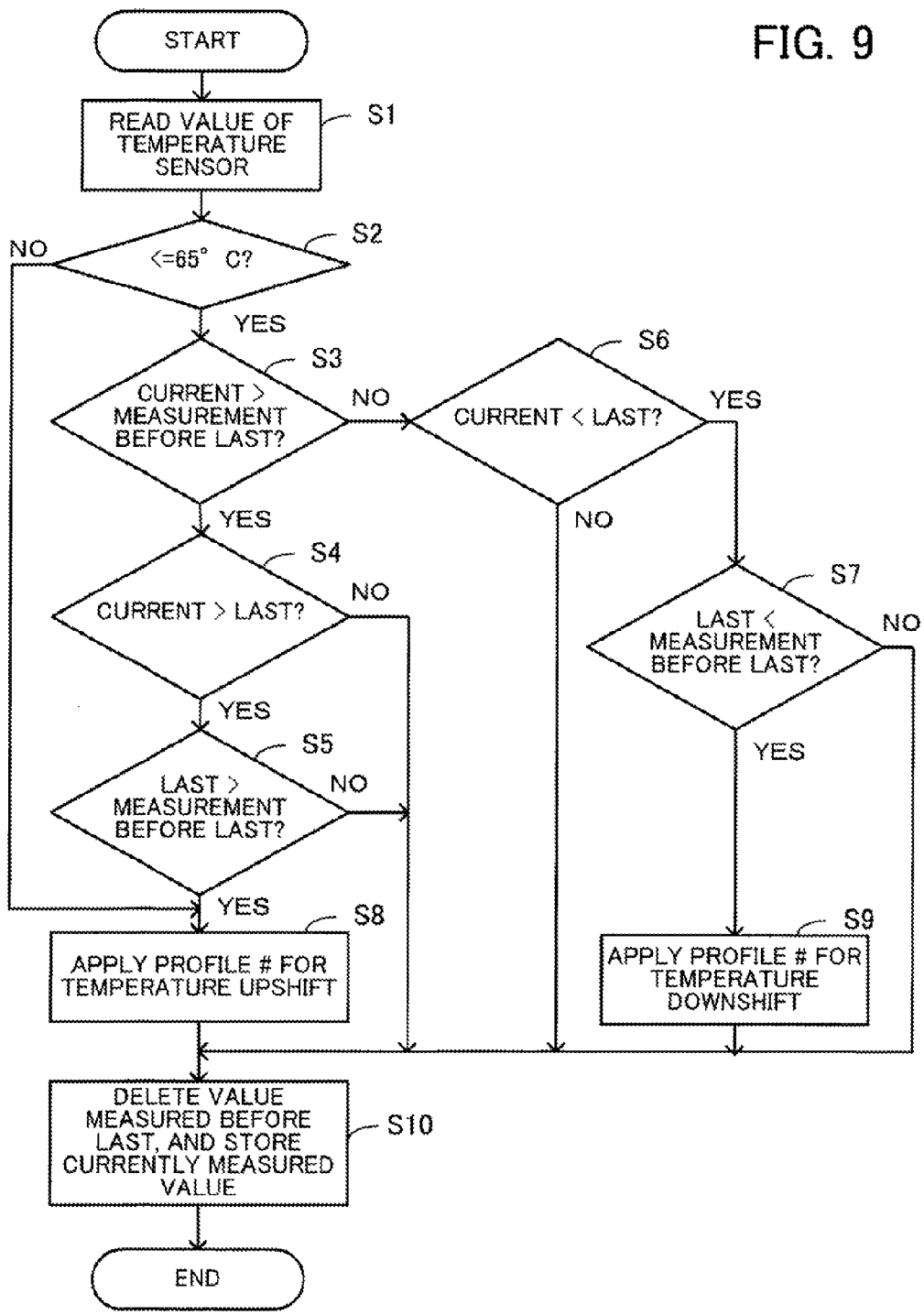
FIG. 9 is a flowchart illustrating a profile application operation.

Next described is a profile application operation based on the measured temperature values. FIG. 9 is a flowchart illustrating the profile application operation. The following describes an operation performed based on temperature values measured by the temperature sensor 17*a*.

<Step S1> The CPU 16 reads a temperature value of the temperature sensor 17*a*.

<Step S2> The CPU 16 determines whether the read temperature value is 65° C. or less. When the read temperature value is 65° C. or less, the process proceeds to Step S3. If not, the process proceeds to Step S8.

<Step S3> The CPU 16 determines whether the temperature measured this time (currently measured temperature value) is higher than a value measured before the last measurement. When the currently measured temperature value is higher, the process proceeds to Step S4. If not, the process proceeds to Step S6.

<Step S4> The CPU 16 determines whether the currently measured temperature value is higher than a value of the last measurement. When the currently measured temperature value is higher, the process proceeds to Step S5. If not, the process proceeds to Step S10.

<Step S5> The CPU 16 determines whether the value of the last measurement is higher than the value measured before the last measurement. When the value of the last measurement is higher, the process proceeds to Step S8. If not, the process proceeds to Step S10.

<Step S6> The CPU 16 determines whether the currently measured temperature value is lower than the value of the last measurement. When the currently measured temperature value is lower, the process proceeds to Step S7. If not, the process proceeds to Step S10.

<Step S7> The CPU 16 determines whether the value of the last measurement is lower than the value measured before the last measurement. When the value of the last measurement is lower, the process proceeds to Step S9. If not, the process proceeds to Step S10.

<Step S8> The CPU 16 applies a profile (profile number) for temperature upshift.

<Step S9> The CPU 16 applied a profile (profile number) for temperature downshift.

<Step S10> The CPU 16 deletes the temperature value measured before the last measurement, and stores the currently measured temperature value.

As described above, in Step S2, whether the read temperature value is 65° C. or less is determined. This is because, in this case, the top check temperature is set to 65° C. and the reception rate control is immediately implemented if the temperature value is more than 65° C. In addition, in Steps S3 to S7, the change in temperature in a predetermined period of time is determined. That is, it is determined whether the measured temperature values are on the rise or on the decline and whether the measured temperature values oscillate and repeat up and down. The determination is made by comparing the three measured values, namely the temperature measured this time (currently measured temperature value), the temperature in the last measurement, and the temperature measured before the last measurement.

The following is described with specific measurement values. In the following case, the reception rate control is implemented with respect to individual ports, and the profile table 18*a* is used.

(Case where Measured Temperature Exceeds 65° C.)

Assume that the currently measured temperature value is 70° C. in Step S2. The process proceeds to Step S8, in which a profile for temperature upshift is applied. It is understood with reference to the graph of FIG. 7, profile #3 is applied in the case where the currently measured temperature value exceeds 65° C. Accordingly, with reference to the profile table 18*a* of FIG. 5, the reception rate control based on the transmission rates of profile #3 is implemented for received packets of the ports P1 to Pn.

(Case of Temperature Upshift)

Assume that the temperature measured before the last measurement is 43° C., the temperature of the last measurement is 57° C., and the currently measured temperature value is 62° C. The flow of the branch process is as follows: YES in Step S2→YES in Step S3→YES in Step S4→YES in Step S5→Step S8. Thus, it is determined that the temperature is on the rise, and a profile is applied according to the profiles for temperature upshift illustrated in FIG. 7.

(Case of Temperature being on the Decline)

Assume that the temperature measured before the last measurement is 62° C., the temperature of the last measurement is 57° C., and the currently measured temperature value is 43° C. The flow of the branch process is as follows: YES in Step S2→NO in Step S3→YES in Step S6→YES in Step S7→Step S9. Thus, it is determined that the temperature is on the decline, and a profile is applied according to the profiles for temperature downshift illustrated in FIG. 8. It is understood with reference to the graph of FIG. 8, profile #1 is applied in the case where the currently measured temperature value is 43° C. Accordingly, with reference to the profile table 18*a* of FIG. 5, the reception rate control based on the transmission rates of profile #1 is implemented for the received packets of the ports P1 to Pn.

(Case where Temperature Decreases after being on the Rise)

In this case, two patterns can be considered, that is, the case where the currently measured temperature value falls between the temperature measured before the last measurement and the temperature of the last measurement (pattern 1), and the case where the currently measured temperature value is lower than the temperature measured before the last measurement (pattern 2).

(Case of Pattern 1)

Assume that the temperature measured before the last measurement is 43° C., the temperature of the last measurement is 62° C., and the currently measured temperature value is 57° C. The flow of the branch process is as follows: YES in Step S2→YES in Step S3→NO in Step S4→Step S10.

(Case of Pattern 2)

Assume that the temperature measured before the last measurement is 57° C., the temperature of the last measurement is 62° C., and the currently measured temperature value is 43° C. The flow of the branch process is as follows: YES in Step S2→NO in Step S3→YES in Step S6→NO in Step S7→Step S10.

In both the above-described patterns 1 and 2, the temperature increases from the measurement before the last to the last measurement, and decreases from the last measurement to the current measurement. That is, the temperature oscillates in the predetermined period of time. In such a case, no profile is applied, and the temperature value measured before the last measurement is deleted in Step S10. In addition, the measured value of the last measurement is newly set as the temperature measured before the last measurement, and the currently measured value is newly set as the temperature of the last measurement. Subsequently, the flow of the profile application operation is performed again using a temperature value read in the next cycle as the currently measured temperature value.

(Case where Temperature Increases after being on the Decline)

In this case, two patterns can be considered, that is, the case where the currently measured temperature value falls between the temperature measured before the last measurement and the temperature of the last measurement (pattern 1), and the case where the currently measured temperature value is higher than the temperature measured before the last measurement (pattern 2).

(Case of Pattern 1)

Assume that the temperature measured before the last measurement is 62° C., the temperature of the last measurement is 43° C., and the currently measured temperature value is 57° C. The flow of the branch process is as follows: YES in Step S2→NO in Step S3→NO in Step S6→Step S10.

(Case of Pattern 2)

Assume that the temperature measured before the last measurement is 57° C., the temperature of the last measurement is 43° C., and the currently measured temperature value is 62° C. The flow of the branch process is as follows: YES in Step S2→YES in Step S3→YES in Step S4→NO in Step S5→Step S10.

In both the above-described patterns 1 and 2, the temperature decreases from the measurement before the last to the last measurement, and increases from the last measurement to the current measurement. That is, the temperature oscillates in the predetermined period of time. In such a case also, no profile is applied, as in the above-described case where the temperature decreases after being on the rise. That is, the temperature value measured before the last measurement is deleted in Step S10. In addition, the measured value of the last measurement is newly set as the temperature measured before the last measurement, and the currently measured value is newly set as the temperature of the last measurement. Subsequently, the flow of the profile application operation is performed again using a temperature value read in the next cycle as the currently measured temperature value.

Thus, the communication device 1 is configured to recognize the change in temperature in the predetermined period of time to see, over time, whether the temperature is on the rise or the decline, or repeats up and down, and implement phased transmission rate control according to the change in temperature.

Fixed transmission rate setting based on a simple determination of whether the measured temperature exceeds a threshold value may impose a limitation on the transmission rates more than necessary even if the heat generation of the device is suppressed. On the other hand, according to the communication device 1, the above-described control allows the transmission rates to be set small in a phased manner in the case where the temperature is on the rise, and allows the transmission rates to be set large in a phased manner in the case where the temperature is on the decline. Thus, it is possible to set adequate transmission rate values for suppressing the heat generation. In addition, the communication device 1 is configured to stop the profile selecting process in the case of recognizing the temperature change in which temperature upshift and downshift are repeated in the predetermined period of time (temperature oscillation), based on the currently measured temperature value, the temperature of the last measurement, and the temperature measured before the last measurement. That is, the profile-based transmission rate setting is stopped in the case where the temperature oscillates in the predetermined period of time, and the profile-based transmission rate setting is performed in the case where the temperature is on the rise or the decline in the predetermined period of time. Thus, change of the transmission rates is stopped during the temperature oscillation, which enables stable reception rate control.

Next described are modifications. In the above-described line IF card, the temperature sensors 17a and 17b and the profile tables 18a and 18b are connected to the control bus, and the CPU 16 selects a profile number based on the measured temperature values. Subsequently, the selected profile number is notified to the NPU 12, which then performs the reception rate control based on the profile number. On the other hand, according to a first modification, the temperature sensors 17a and 17b and the profile tables 18a and 18b are connected to the NPU 12, which then selects a profile number based on the measured temperature values and also performs the reception rate control based on the profile number. That is, the function of the processor 1c of FIG. 1 is implemented by the NPU 12.

Figure 10:
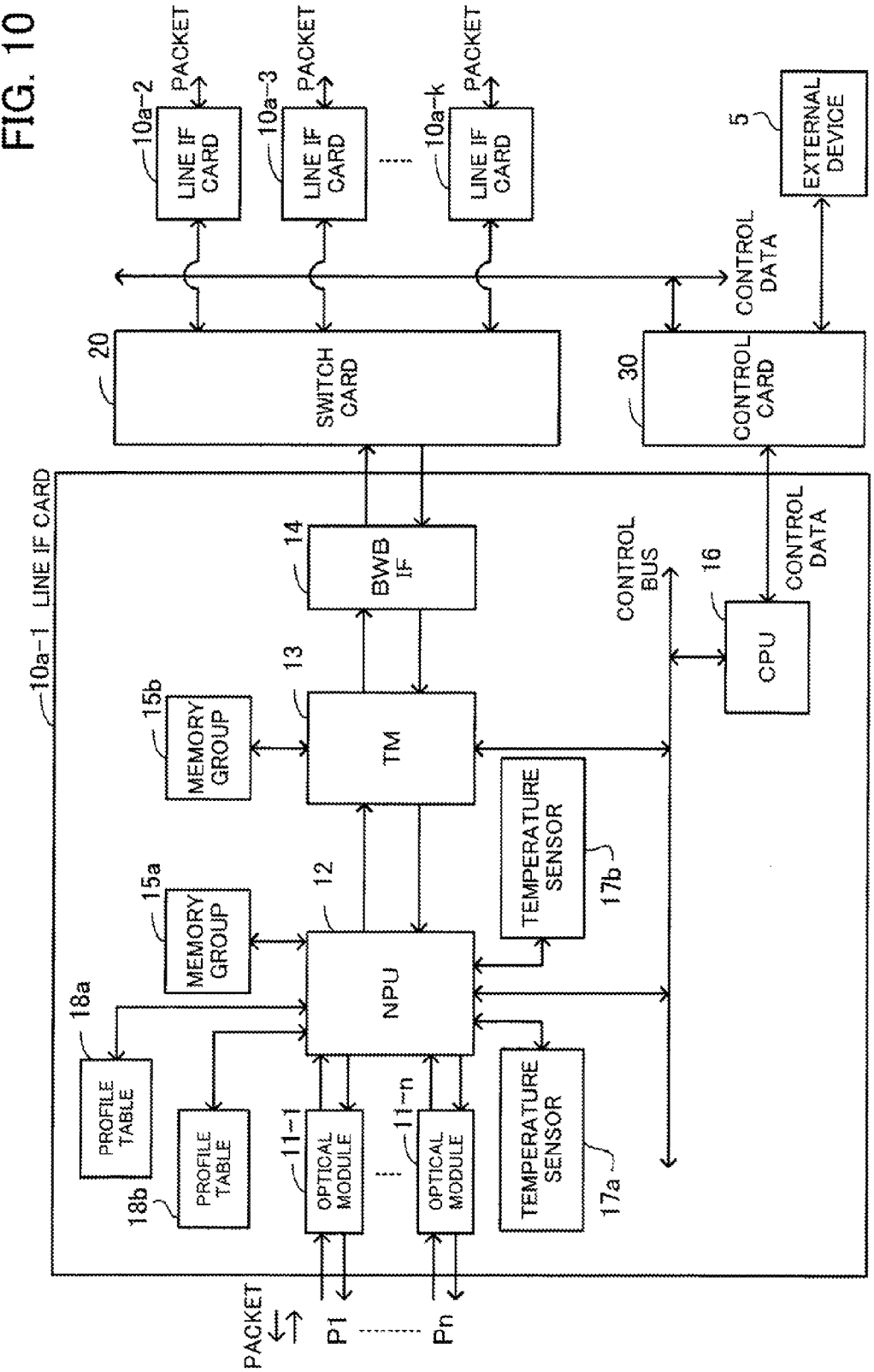
FIG. 10 illustrates a configuration example of another line IF card.

FIG. 10 illustrates a configuration example of another line IF card. A line IF card 10a-1 includes the optical modules 11-1 to 11-n, the NPU 12, the TM 13, the BWBIF 14, the memory groups 15a and 15b, the CPU 16, the temperature sensors 17a and 17b, and the profile tables 18a and 18b. The temperature sensors 17a and 17b and the profile tables 18a and 18b are connected to the NPU 12. The rest of the internal configuration is the same as that of FIG. 4, and repeated explanations will be omitted. Such a configuration allows the NPU 12 to periodically read a profile and autonomously perform the reception rate control. In addition, it is possible to reduce the load of the CPU 16. Note that the temperature sensors 17a and 17b and the profile tables 18a and 18b may be disposed inside the NPU 12.

Next described is a second modification. According to the configuration of FIG. 4, in order to control the heat generation, only the line IF card 10-1 (that is, the receiving side) performs the reception rate control on the packets transmitted to the line IF card 10-1. On the other hand, according to the second modification, a back pressure is exerted on a line IF card on a sending side so that the sending-side line IF card also performs transmission rate control (sending rate control).

Figure 11:
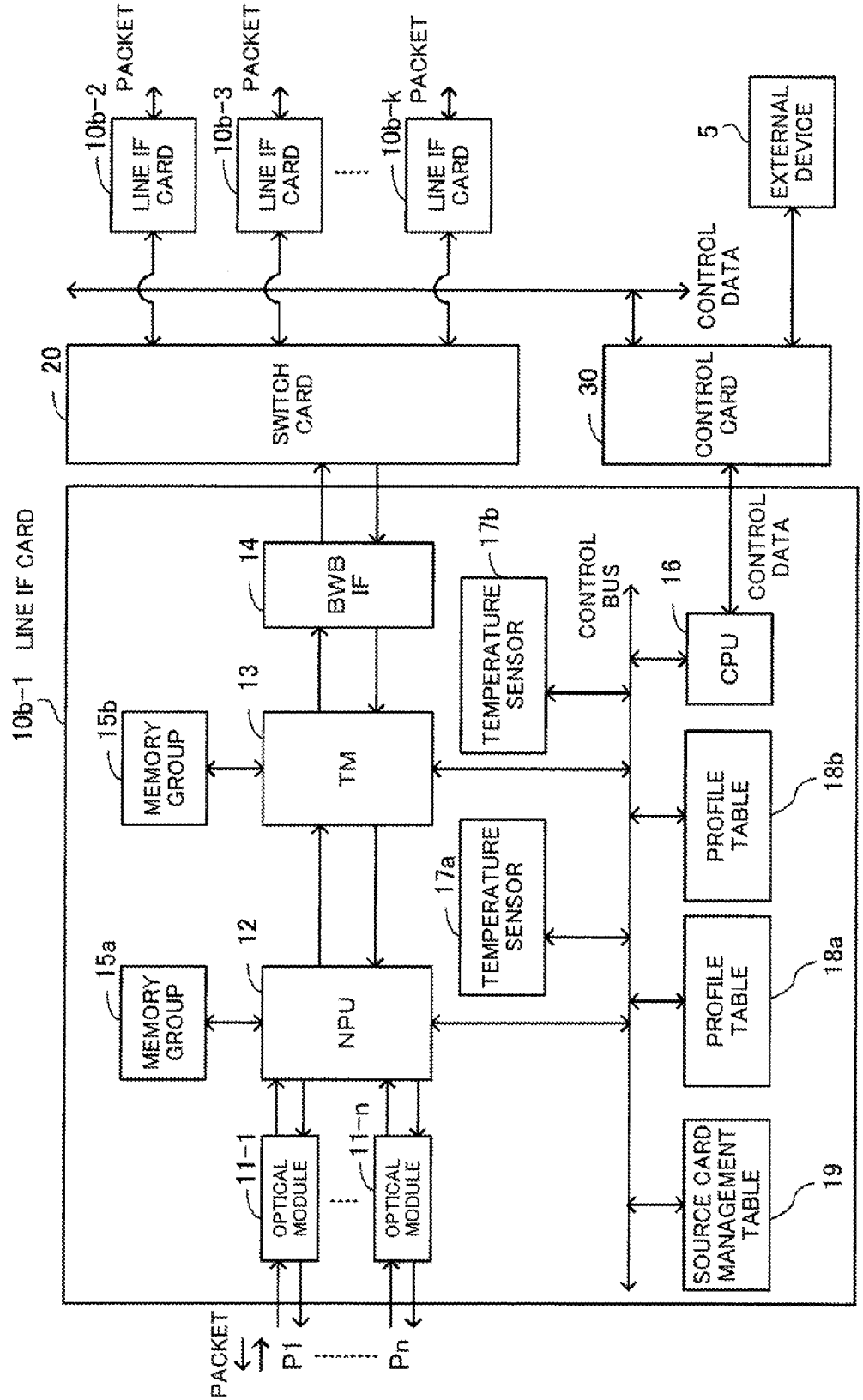
FIG. 11 illustrates a configuration example of yet another line IF card.

FIG. 11 illustrates a configuration example of yet another line IF card. A line IF card 10b-1 includes the optical modules 11-1 to 11-n, the NPU 12, the TM 13, the BWBIF 14, the memory groups 15a and 15b, the CPU 16, the temperature sensors 17a and 17b, the profile tables 18a and 18b, and a source card management table (source management table) 19. That is, the line IF card 10b-1 differs from the line IF card 10-1 of FIG. 4 in including the source card management table 19. The source card management table 19 is connected to the control bus. The source card management table 19 is stored in a storage medium, such as a memory. The profile tables 18a and 18b and the source card management table 19 may be individually stored in different memories, or may be all stored in a single memory.

The source card management table 19 manages line IF cards with which the line IF card 10b-1 communicates via the switch card 20. That is, the source card management table 19 manages communication statuses of target source cards. FIG. 12 illustrates a configuration example of the source card management table. The source card management table 19 includes item attributes of a card number 19-1 and a source card 19-2. In the card number 19-1, identification numbers of line IF cards are included. In the source card 19-2, the status of communication with each of the source cards is indicated. Specifically, the status of communication is indicated as "in communication" in the case where the line IF card currently communicates with a source card, and the communication status is indicated as "out of communication" in the case where the line IF card does not currently perform communication with the source card. The example of FIG. 12 illustrates that there are twenty line IF cards, and an uplink-side line IF card #1 communicates with seventeen downlink-side line IF cards #3 to #19.

Figure 13:
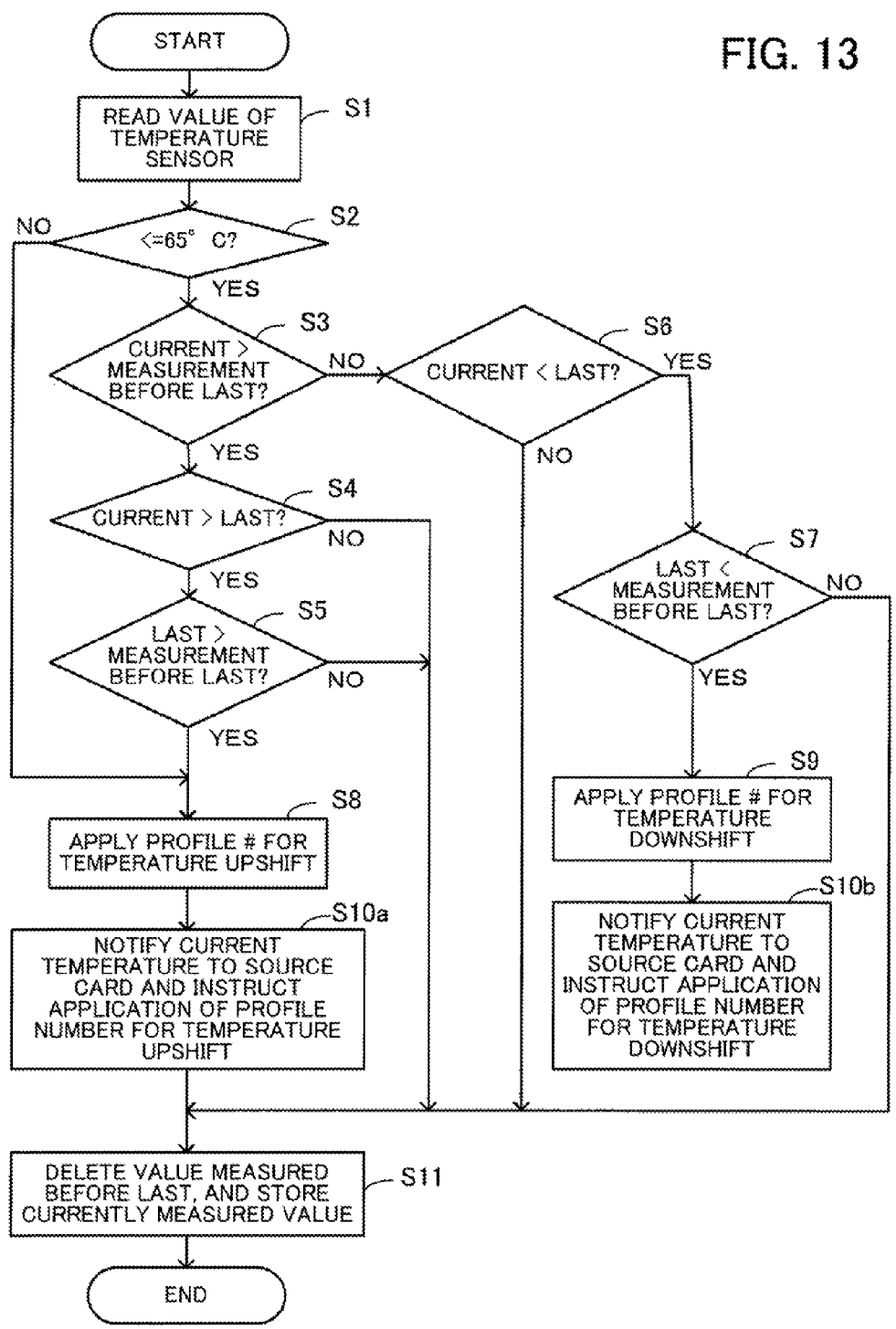
FIG. 13 is a flowchart illustrating another profile application operation.

Next described is a profile application operation based on the measured temperature values according to the second modification. FIG. 13 is a flowchart illustrating the profile application operation. The following describes an operation performed based on temperature values measured by the temperature sensor 17a.

<Step S1> The CPU 16 reads a temperature value of the temperature sensor 17a.

<Step S2> The CPU 16 determines whether the read temperature value is 65° C. or less. When the read temperature value is 65° C. or less, the process proceeds to Step S3. If not, the process proceeds to Step S8.

<Step S3> The CPU 16 determines whether the temperature measured this time (currently measured temperature value) is higher than a value measured before the last measurement. When the currently measured temperature value is higher, the process proceeds to Step S4. If not, the process proceeds to Step S6.

<Step S4> The CPU 16 determines whether the currently measured temperature value is higher than a value of the last measurement. When the currently measured temperature value is higher, the process proceeds to Step S5. If not, the process proceeds to Step S11.

<Step S5> The CPU 16 determines whether the value of the last measurement is higher than the value measured before the last measurement. When the value of the last measurement is higher, the process proceeds to Step S8. If not, the process proceeds to Step S11.

<Step S6> The CPU 16 determines whether the currently measured temperature value is lower than the value of the last measurement. When the currently measured temperature value is lower, the process proceeds to Step S7. If not, the process proceeds to Step S11.

<Step S7> The CPU 16 determines whether the value of the last measurement is lower than the value measured before the last measurement. When the value of the last measurement is lower, the process proceeds to Step S9. If not, the process proceeds to Step S11.

<Step S8> The CPU 16 applies a profile (profile number) for temperature upshift.

<Step S9> The CPU 16 applied a profile (profile number) for temperature downshift.

<Step S10a> The CPU 16 notifies the current temperature to a source card and instructs the source card to apply a profile number for temperature upshift.

<Step S10b> The CPU 16 notifies the current temperature to a source card and instructs the source card to apply a profile number for temperature downshift.

<Step S11> The CPU 16 deletes the temperature value measured before the last measurement, and stores the currently measured temperature value.

As described above, the line IF card 10b-1 includes the source card management table 19 in which source cards of the received packets are registered, and a source card is recognized with reference to the source card management table 19. Subsequently, the currently measured temperature value is notified to the source card so as to cause the source card to perform the sending rate control. With this, transmission rate control is performed not only on the receiving side but also on the sending side. Accordingly, it is possible to suppress the heat generation in a shorter period of time.

Note that in the above description, the heat generation is suppressed by performing the transmission rate control. However, in order to control the heat generation, another configuration may be adopted in which, at the time when the temperature is high, the processor 1c transmits pause packets to a target device to stop transmission of packets from the target device. Alternatively, a configuration may be adopted in which, at the time when the temperature is high, the processor 1c performs call admission control (CAC) to stop setting of new call admissions (for example, port opening setting and new VLAN setting). Further, it is possible to suppress the heat generation by combining these controls accordingly.

According to one embodiment, it is possible to facilitate the setting control for suppression of the heat generation.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that various changes, substitutions, and alterations could be made hereto without departing from the spirit and scope of the invention.

What is claimed is:

1. A communication apparatus comprising:
  a temperature sensor configured to measure temperature;
  a memory configured to store association groups of packet transmission rates associated with at least one of individual ports and individual transmission flows; and
  a processor configured to select, based on the measured temperature, one of the association groups of packet transmission rates for suppressing heat generation, and control reception rates using the selected association group of packet transmission rates;
  wherein
  the processor holds a first correspondence relationship between the association groups of packet transmission rates and the measured temperature at a time of temperature upshift in a predetermined period of time and a second correspondence relationship between the association groups of packet transmission rates and the measured temperature at a time of temperature downshift in the predetermined period of time,
  in a case of recognizing the temperature upshift based on a currently measured temperature value, a temperature value of a last measurement, and a temperature value measured before the last measurement, the processor selects, in a phased manner, the one of the association groups of packet transmission rates based on the measured temperature according to the first correspondence relationship, and
  in a case of recognizing the temperature downshift based on the currently measured temperature value, the temperature value of the last measurement, and the temperature value measured before the last measurement, the processor selects, in the phased manner, the one of the association groups of packet transmission rates based on the measured temperature according to the second correspondence relationship.

2. The communication apparatus according to claim 1, wherein
  the processor provides a hysteresis between threshold temperature values set for the first correspondence relationship and threshold temperature values set for the second correspondence relationship.

3. The communication apparatus according to claim 1, further comprising:
  a source management table in which source apparatuses of received packets are registered,
  wherein the processor recognizes a source apparatus with reference to the source management table, and notifies a currently measured temperature value to the source apparatus so as to cause the source apparatus to perform sending rate control.

4. A communication apparatus comprising:
  a temperature sensor configured to measure temperature;
  a memory configured to store association groups of packet transmission rates associated with at least one of individual ports and individual transmission flows; and
  a processor configured to select, based on the measured temperature, one of the association groups of packet transmission rates for suppressing heat generation, and control reception rates using the selected association group of packet transmission rates;
  wherein
  the processor stops selecting the one of the association groups of packet transmission rates in a case of recognizing temperature change in which temperature upshift and downshift are repeated in a predetermined period of time, based on a currently measured temperature value, a temperature value of a last measurement, and a temperature value measured before the last measurement.

5. A heat generation suppressing method executed by a computer that includes a first memory for storing association groups of packet transmission rates associated with at least one of individual ports and individual transmission flows, the heat generation suppressing method comprising:
  selecting, based on a measured temperature, one of the association groups of packet transmission rates for suppressing heat generation;
  controlling reception rates using the selected association group of packet transmission rates; and
  stopping selecting the one of the association groups of packet transmission rates in a case where temperature change in which temperature upshift and downshift are repeated in a predetermined period of time is recognized based on a currently measured temperature value, a temperature value of a last measurement, and a temperature value measured before the last measurement.

6. The heat generation suppressing method according to claim 5, wherein
  the computer further includes a second memory for storing information of source apparatuses of received packets, and the heat generation suppressing method further comprising:
recognizing a source apparatus with reference to the information stored in the second memory, and notifying a currently measured temperature value to the source apparatus so as to cause the source apparatus to perform sending rate control.

7. The heat generation suppressing method according to claim 5, further comprising:
holding a first correspondence relationship between the association groups of packet transmission rates and the measured temperature at a time of temperature upshift in a predetermined period of time and a second correspondence relationship between the association groups of packet transmission rates and the measured temperature at a time of temperature downshift in the predetermined period of time;
selecting, in a phased manner, the one of the association groups of packet transmission rates based on the measured temperature according to the first correspondence relationship in a case where the temperature upshift is recognized based on a currently measured temperature value, a temperature value of a last measurement, and a temperature value measured before the last measurement; and
selecting, in the phased manner, the one of the association groups of packet transmission rates based on the measured temperature according to the second correspondence relationship in a case where the temperature downshift is recognized based on the currently measured temperature value, the temperature value of the last measurement, and the temperature value measured before the last measurement.

8. The heat generation suppressing method according to claim 7, wherein
a hysteresis is provided between threshold temperature values set for the first correspondence relationship and threshold temperature values set for the second correspondence relationship.

* * * * *